United States Patent
Wang et al.

(10) Patent No.: US 9,940,337 B2
(45) Date of Patent: Apr. 10, 2018

(54) PREDICTIVE PROBABILISTIC DEDUPLICATION OF STORAGE

(71) Applicant: VMware, Inc., Palo Alto, CA (US)

(72) Inventors: Wenguang Wang, Santa Clara, CA (US); Tian Luo, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 362 days.

(21) Appl. No.: 14/726,597

(22) Filed: May 31, 2015

(65) Prior Publication Data

US 2016/0350324 A1 Dec. 1, 2016

(51) Int. Cl.
G06F 17/30 (2006.01)
G06N 7/00 (2006.01)
G06F 3/06 (2006.01)
G06F 11/14 (2006.01)

(52) U.S. Cl.
CPC ...... *G06F 17/30156* (2013.01); *G06F 3/0608* (2013.01); *G06F 3/0641* (2013.01); *G06F 11/1453* (2013.01); *G06F 17/3033* (2013.01); *G06F 17/30097* (2013.01); *G06F 17/30159* (2013.01); *G06N 7/005* (2013.01)

(58) Field of Classification Search
CPC ......... G06F 17/30159; G06F 17/30156; G06F 17/30097; G06F 17/3033; G06F 17/30581; G06F 3/0608; G06F 3/0641; G06F 3/0617; G06F 3/1451; G06F 2201/84; G06F 11/1453; G06F 11/1451; G06F 11/1435; G06F 11/1461; G06F 11/1456
See application file for complete search history.

(56) References Cited

U.S. PATENT DOCUMENTS

| | | | | |
|---|---|---|---|---|
| 6,928,526 B1 * | 8/2005 | Zhu | ............ | G06F 3/0608 711/118 |
| 7,818,495 B2 * | 10/2010 | Tanaka | ............ | G06F 3/0608 711/103 |
| 8,392,384 B1 * | 3/2013 | Wu | ............ | G06F 17/30156 707/693 |

(Continued)

FOREIGN PATENT DOCUMENTS

WO WO 2013/058747 * 4/2013
WO WO 2014/063062 * 4/2014

OTHER PUBLICATIONS

Fei Xie et al., "Estimating Duplication by Content-based Sampling", USENIX Annual Technical Conference, 2013, pp. 181-186.*

(Continued)

*Primary Examiner* — Srirama Channavajjala (57) ABSTRACT

Examples perform predictive probabilistic deduplication of storage, such as virtualized or physical disks. Incoming input/output (I/O) commands include data, which is written to storage and tracked in a key-value store. The key-value store includes a hash of the data as the key, and a reference counter and the address of the data as the value. When a certain percentage of sampled incoming data is found to be duplicate, it is predicted that the I/O commands have become not unique (e.g., duplicate). Based on the prediction, subsequent incoming data is not written to storage, and instead the reference counter associated with the hash of the data is incremented. In this manner, predictions on the uniqueness of future data is made based on previous data, and extraneous writes and deletions from the chunk store are avoided.

20 Claims, 7 Drawing Sheets

(56) References Cited

U.S. PATENT DOCUMENTS

| | | | | |
|---|---|---|---|---|
| 2009/0307251 | A1* | 12/2009 | Heller | G06F 17/3015 |
| 2010/0333116 | A1* | 12/2010 | Prahlad | G06F 17/30082 |
| | | | | 719/328 |
| 2011/0040732 | A1* | 2/2011 | Anglin | G06F 11/1453 |
| | | | | 707/687 |
| 2011/0055471 | A1* | 3/2011 | Thatcher | G06F 3/0608 |
| | | | | 711/114 |
| 2011/0145523 | A1* | 6/2011 | Gupta | G06F 3/0608 |
| | | | | 711/159 |
| 2011/0246741 | A1* | 10/2011 | Raymond | G06F 17/30159 |
| | | | | 711/170 |
| 2011/0271033 | A1* | 11/2011 | Williams | G06F 17/30097 |
| | | | | 711/102 |
| 2012/0124011 | A1* | 5/2012 | Spackman | G06F 17/30162 |
| | | | | 707/692 |
| 2012/0151169 | A1* | 6/2012 | Mori | G06F 3/0641 |
| | | | | 711/166 |
| 2012/0226672 | A1* | 9/2012 | Hayashi | G06F 3/0608 |
| | | | | 707/698 |
| 2013/0086006 | A1* | 4/2013 | Colgrove | G06F 17/30159 |
| | | | | 707/692 |
| 2013/0086353 | A1* | 4/2013 | Colgrove | G06F 3/0608 |
| | | | | 711/206 |
| 2013/0339319 | A1* | 12/2013 | Woodward | G06F 17/30581 |
| | | | | 707/692 |

OTHER PUBLICATIONS

Dirk Meister et al., "Block Locality Caching for Data Deduplication", SYSTOR '13, Jun. 30-Jul. 2, 2013,, pp. 1-12.*

* cited by examiner

PREDICTIVE PROBABILISTIC DEDUPLICATION OF STORAGE

BACKGROUND

Some existing storage systems support deduplication, usually in backup storage. However, much of the data transmitted to a backup storage system is duplicate or only slightly modified. Some existing deduplication solutions maintain a record of data written to storage. Some of those records are organized as one or more key-value tables. In that example, the records are indexed by a hash of a block of the data (e.g., the hash of the block of data is the key), and the value associated with the hash of the block of data is the reference count for that block of data, and its address in storage (e.g., HashOfData is a key into <ReferenceCount, AddressOfData>).

In existing asynchronous deduplication systems, data are first written out to storage media without checking for duplicates. Subsequently, data are read back to calculate the hash and look for duplicates. If no duplicates are found, data are inserted into the key-value table. Later when data are overwritten, they will be removed from the key-value table. However, updating the key-value table, and reading from storage for deduplication, may have a high resource cost.

BRIEF DESCRIPTION OF THE DRAWINGS

Corresponding reference characters indicate corresponding parts throughout the drawings.

DETAILED DESCRIPTION

Examples described herein allow for the in-line or asynchronous deduplication of main storage with less resource consumption than existing deduplication methods. Under the disclosed method, a stream of input/output (I/O) commands to be written to storage are received by an I/O stack, main storage or processor. The data content which makes up the commands are aggregated into groups, referred to as "zones". The data content in each zone is divided into a set of data blocks, which in some examples are four kilobyte (4 k) blocks of data. The zones are created based on time of creation or receipt, origin of the I/O stream, or some other logical classification. In some examples, a zone represents a set of contiguous data blocks. Under the disclosed method, a first zone is sampled to determine whether the blocks in that zone contain unique or duplicate content. Based on the sampling, the disclosed method predicts whether the second or subsequent zone of blocks will contain unique or duplicate content. Based on the prediction, zones of blocks are identified as "unique" or "duplicate" and the blocks in the zones are treated accordingly, until enough blocks which do not accord with the prediction are discovered. At that point, a new prediction is made, the zone of blocks is then predicted as duplicate or unique, and the blocks are treated accordingly. These operations continue as long as I/O content is received.

Examples described herein initially assume that the majority of blocks in the first zone contain data which is either unique or duplicate. In some examples, the zones are 1,000 blocks long. Initially, in some examples, any incoming blocks are assumed to be unique, or not duplicate. Those unique blocks are written directly to the physical storage. Subsequently, a subset of the blocks from the first zone which were already written to physical storage are randomly sampled to determine if the data content in that zone is unique content or duplicate content, in one example. In other examples the blocks are sampled as they are being written to storage. In some examples, 1% of the blocks in a 1,000 block zone are sampled. Based on the random sampling of the incoming blocks in the zone, a prediction is made that subsequent or associated blocks are likely, or expected, to be new or "unique", or that those subsequent or associated blocks are likely to be duplicated or "not unique". If the subsequent blocks are predicted to be unique, the blocks continue to be written to physical storage and sampled until it is predicted that the subsequent blocks are duplicate.

If the subsequent or associated blocks are predicted to be duplicate, they are not written to physical storage. Instead, the reference counter associated with an entry in a key-value table is incremented. During in-line deduplication, a duplicate block is not written to physical storage; instead, the hash of the duplicate block is calculated and the key-value table is updated accordingly. However, during asynchronous deduplication, blocks are written to physical storage when they are received, and deduplicated later if they are duplicate. In some examples, the frequency of duplicate blocks in a unique zone is evaluated, and the sample size is adjusted based on that frequency.

The blocks in a zone are continually sampled and a prediction is made based on the sample. If a threshold amount of unique, or not duplicate, blocks are discovered while the zone is set to duplicate, then the zone is changed back to unique. Consequently, the zone is changed to be unique or duplicate based on the prediction. Incoming blocks are treated in accordance with the predictions. Unique blocks may be described as not duplicate, new, novel, modified, unwritten, and the like. Blocks which are duplicate may be described as duplicate, old, unmodified, unchanged, previously written, and the like.

Deduplicating physical storage using predictive probabilistic deduplication, as described herein, reduces the expensive cost of computing hash values, as well as the amount of extraneous insertions and deletions from the key-value table. Instead, only blocks which are predicted to be duplicate are inserted to the key-value store. Further, read commands to obtain data from storage are not needed for deduplication, in some examples. Aspects of the disclosure conserve resources, at least because fewer writes, reads, and deletions are performed, less storage is used, and fewer processing resources are consumed.

Figure 1:
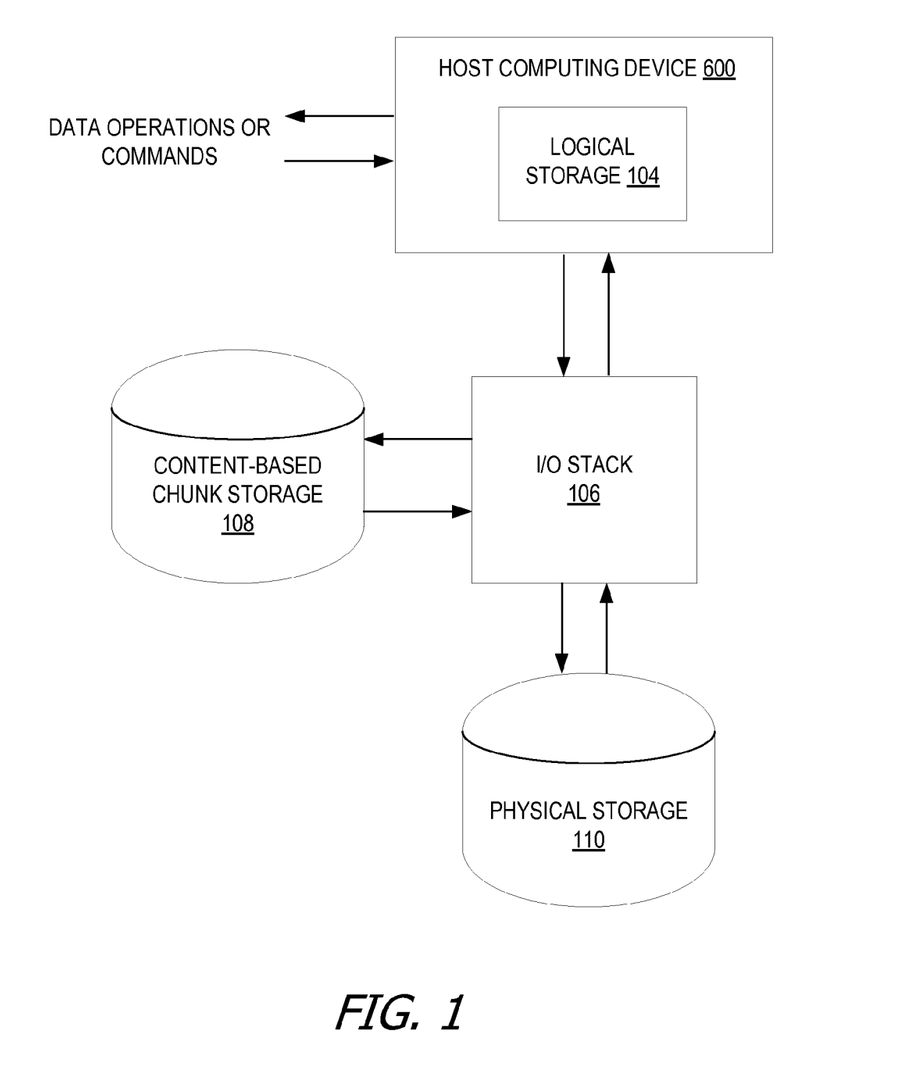
FIG. 1 is a block diagram of an example system for performing predictive probabilistic deduplication.

FIG. 1 is a block diagram of an example system for performing predictive probabilistic deduplication. Data operations or commands come into a host computing device 600. The data operations or commands originate, in some examples, from a user 608, a virtual machine (VM) 735, an application 770, a guest operating system 765, a client, or any other source of data. The data operations or commands are, in some cases, a stream of input/output commands. The logical storage 104 displays the data, in some examples, and any changes made to the data by the incoming data operations or commands.

Any data operations or commands which involve the underlying stored data are passed to the I/O stack 106. In some examples, the I/O stack 106 is virtualized, for example in the ESX server, by VMware, Inc. The I/O stack 106, in turn, communicates with the content-based chunk storage 108 (e.g., the chunk store). The chunk store 108 may include optimized file data, stored as chunks packed into container files. The chunk store 108, in turn, is in contact with the physical storage 110. The physical storage 110 is, in some examples, the main storage for the illustrated system. In other examples, the physical storage is virtualized. In some examples, the physical storage 110 is a virtual storage area network (vSAN) backed by a combination of solid state drives and/or magnetic or spinning disks. In other examples, the physical storage 110 may be virtual disks, virtual volumes, non-virtual storage, or any combination thereof.

Figure 2:
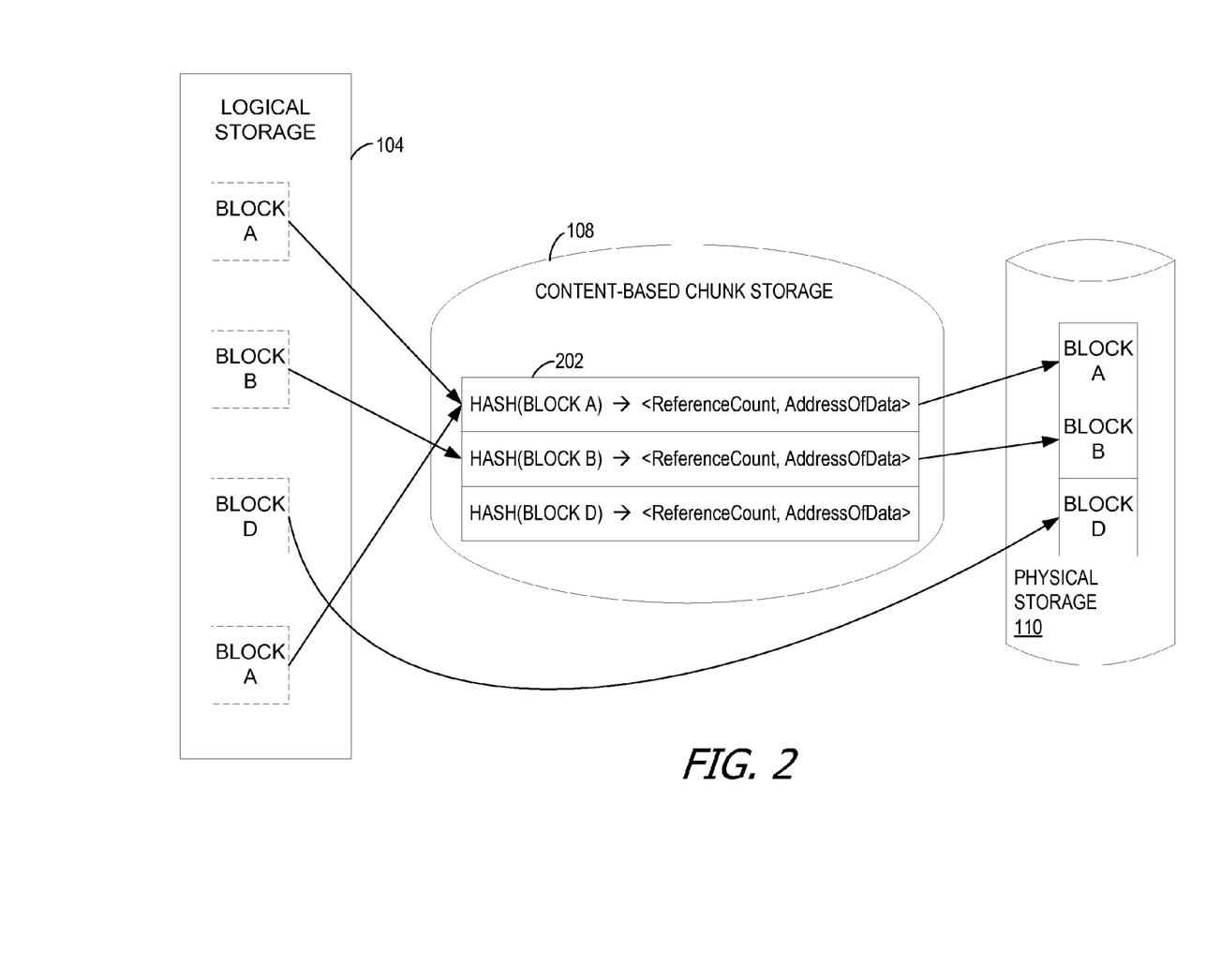
FIG. 2 is a block diagram of the logical, chunk-based, and physical storage layers of the system of FIG. 1.

FIG. 2 is a block diagram of the logical 104, content-based chunk storage 108, and physical storage 110 layers which perform in the present predictive probabilistic deduplication method. In some examples, these layers of storage are on the same host computing device 600. However, in other examples, each layer of storage may be housed separately, or some combination of the layers of storage may be housed together.

The logical storage 104 provides a user 608, application 770, guest operating system 765, virtual machine (VM) 235 or other element with an interface to the data maintained by the physical storage 110 layer. In some examples, no actual data blocks are maintained at the logical storage 104 layer. In that example, the logical storage 104 layer may be a table, database, graphical model, text-based representation, a hierarchical or network model, or any other representation of the storage relationships between data.

The logical storage 104 layer is connected to a chunk store 108 layer. The chunk store 108 contains a table, database, index, or other collection of key-values, in the illustrated example a key-value table 202, representing data stored on the physical storage 110 layer and illustrated on the logical storage 104 layer. In some examples, the key is the hash of a block of data present on the physical storage 110 layer. In that example, the value associated with the key includes a reference counter and the address of the block of data on the main storage layer. For example, the key-value of "Block A" visible on the logical storage 104 layer is key=hash(Block A), which points to value=<ReferenceCount, AddressOfData>. In some examples, when the hash of a unique block is calculated, a new entry is created in the key-value table 202 of the chunk store, and the ReferenceCount of the hash is initialized at one. As duplicates of a block are discovered, the ReferenceCount is incremented. Blocks A and B are an illustration of this example.

As illustrated in FIG. 2, blocks which contain the same data content may be duplicated on the logical storage 104 layer; however, those duplicate blocks point to the same value in the key-value table 202 of the chunk store 108. For example, as illustrated, Block A is present twice in the logical storage 104 of FIG. 2; however, both instances of Block A point to the same entry in the key-value table 202 of the chunk store 108 (e.g., an index). In this example, the reference count of the hash of Block A is 2, since 2 entries on the logical storage 104 layer point to the entry of Block A in the key-value table 202. Writing and removing duplicate entries from the key-value table 202 on the chunk store 108 is costly in terms of resources. The disclosed predictive probabilistic deduplication method limits unnecessary writes and removals from the key-value table 202 on the chunk store 108 by anticipating which writes are duplicates, thereby conserving resources and making deduplication more efficient.

However, in other examples, illustrated in Block D of FIG. 2, the ReferenceCount of the hash is not initialized at one, instead it is initialized at zero. In that example, the key-value table 202 does not store the AddressOfData when there is only a single instance of the block. Instead, the chunk store 108 does not find the physical data, but the logical storage 104 still finds the data. In that example, the logical storage 104 has pointer directly pointing to the block, which is used to serve reads without going through the chunk store 108. When the same data are inserted the second time, the ReferenceCount is set to 1 and AddressOfData is set to point to the second copy of the data.

The chunk store 108 is also connected to the physical storage 110. In the present example, data is subdivided into 4 k blocks called "blocks". However, any subdivision or unit size of data is contemplated. The address of the blocks of data on the physical storage 110 level is stored by the key-vale table 202 in the chunk store 108. With the described method of predictive probabilistic deduplication, blocks which are presumed to be unique based on the sampling of the I/O stream are automatically inserted into the physical storage 110 layer. During in-line deduplication, a duplicate block is not written to physical storage; instead the hash of the duplicate block is calculated and the key-value table 202 is updated accordingly. However, during asynchronous deduplication implementations, blocks are written to physical storage when they are received, and deduplicated later if they are duplicate.

Figure 3:
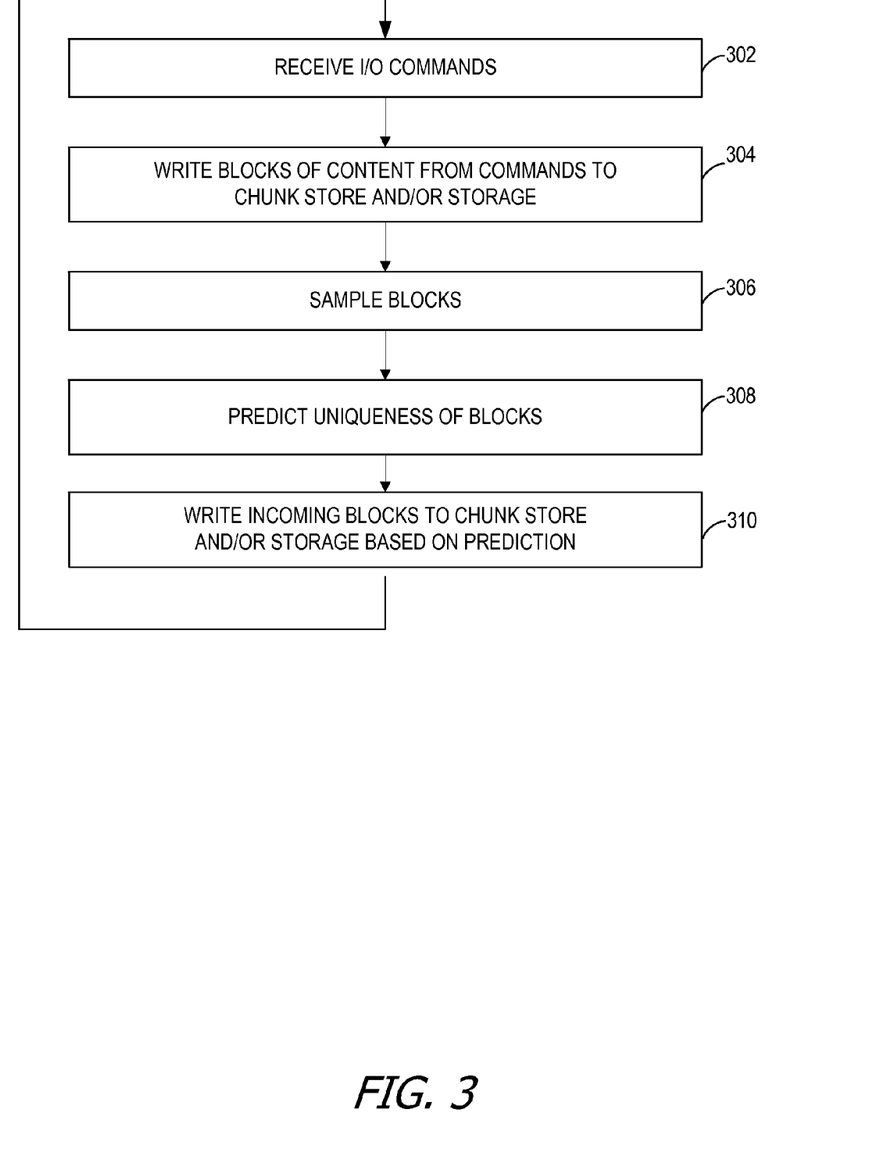
FIG. 3 is a flowchart of an example method of deduplicating storage using a predictive probabilistic method.

FIG. 3 is a flowchart of an example method of deduplicating storage using a predictive probabilistic method as performed by a processor which, in some examples, performs operations to implement an I/O stack 106. At 302 a stream of I/O commands are received by the logical storage layer 104. In some examples, the I/O commands originate with a user 608, a virtual machine (VM) 735, an application 770, a guest operating system 765, a client, or any other source of I/O commands. The I/O commands contain data, data items, payload, content, etc. The stream of I/O commands are, in some examples, subdivided into blocks (e.g., a first plurality of blocks). In some examples, the blocks are 4 k in size; however, any size or combination of size of blocks is contemplated.

Groups of contiguous blocks are described as zones. In some examples, a zone is 1,000 blocks in length. In other examples, zones are created based on the user of origin, the application of origin, or some other common factor. Initially, the zone is classified as "unique". At 304, the blocks in the unique zone are written into storage. As the blocks are written into storage, an entry is also created for them in the key-value table 202 located on the chunk store 108. Creating an entry for the blocks in the key-value table 202 includes, in some examples, calculating the hash of the block, and using the hash as the key. The associated value is the reference counter for the block, and its address on the physical storage 110 (e.g., HashOfData is the key to <ReferenceCount, AddressOfData>).

At 306, a random sample is taken from the zone of blocks. Sampling is done in any manner, including but not limited to random, stratified, cluster, multistage, systematic, or in accordance with an algorithm. The sample is taken, in some examples, after all blocks in the zone of determinate size are received. In some examples, 1% of 1,000 blocks is sampled after all of the 1,000 blocks are received. In other examples, blocks are sampled as the I/O stream is received. Every 100th block, for example, is sampled to provide a 1% sample of 1,000 blocks. In other examples, or to change the reliability of the predictions, the percentage of blocks sampled is increased or decreased, or the zone size is increased or decreased. For example, if the deduplication is not aggressive enough and too few duplicate blocks are being identified, the zone size is decreased to compensate, or the percentage of blocks sampled is increased.

Based on the sample at 306, a prediction is made on whether incoming blocks (e.g., a second plurality of blocks) are unique, or not at 308. If the sample of blocks from the unique zone revealed blocks which are duplicate, the prediction is that the remainder of the incoming zone, or the subsequent zone, is no longer unique, and the zone is then changed to the duplicate zone (e.g., subsequent blocks are assumed to be duplicates). Otherwise, if no duplicate blocks are found in the sample or if the number of duplicate blocks is below an established threshold, the zone remains unique.

Likewise, if the system is operating in the duplicate zone and some threshold of unique blocks are found, then the zone is changed to the unique zone (e.g., subsequent blocks are assumed to be unique). In some examples, the threshold is set at 10%, such that if 10% of the last 1,000 blocks are unique, then the zone is changed back to unique. A "uniqueness counter" or some other tabulation variable is used to track the number of unique blocks discovered in a duplicate zone. In the example of the uniqueness counter, each time a unique block is discovered in the duplicate zone the uniqueness counter is incremented. The threshold is, in some examples, set by a policy, by system requirements, by a client, user 608, application 770, etc.

Based on the prediction, the blocks are treated under a policy specific to the predicted zone at 310. For example, if the blocks are predicted to be unique, they are treated under a unique zone policy. Under the unique zone policy, each block is automatically written to physical storage 110.

If the blocks are predicted to be duplicates, they are treated under a duplicate zone policy. When the zone changes from duplicate to unique, the uniqueness counter is zeroed. In this manner, each duplicate zone is treated separately. Treating each duplicate zone separately ensures that the unique blocks found in a previous zone are not part of the tallying of unique blocks in the current duplicate zone. Zeroing the uniqueness counter in this manner prevents premature predictions that the duplicate zone has changed to unique, and improves the predictions overall.

Under the duplicate zone policy, the hash for each block is found in the key-value table 202, and its reference counter is incremented. If the hash of the block is not discovered, then the uniqueness counter is incremented, and a new entry is made in the key-value table 202. The new entry utilizes the hash of the block as the key, the reference counter, in some examples set to 1, and the address of the block on physical storage 110 are the corresponding value. The remaining blocks in the duplicate zone are still treated under the duplicate zone policy, until the uniqueness counter reaches the threshold at which point the zone changes to the unique zone. The process continues again at 302 as I/O commands continue to flow into the system.

Figure 4:
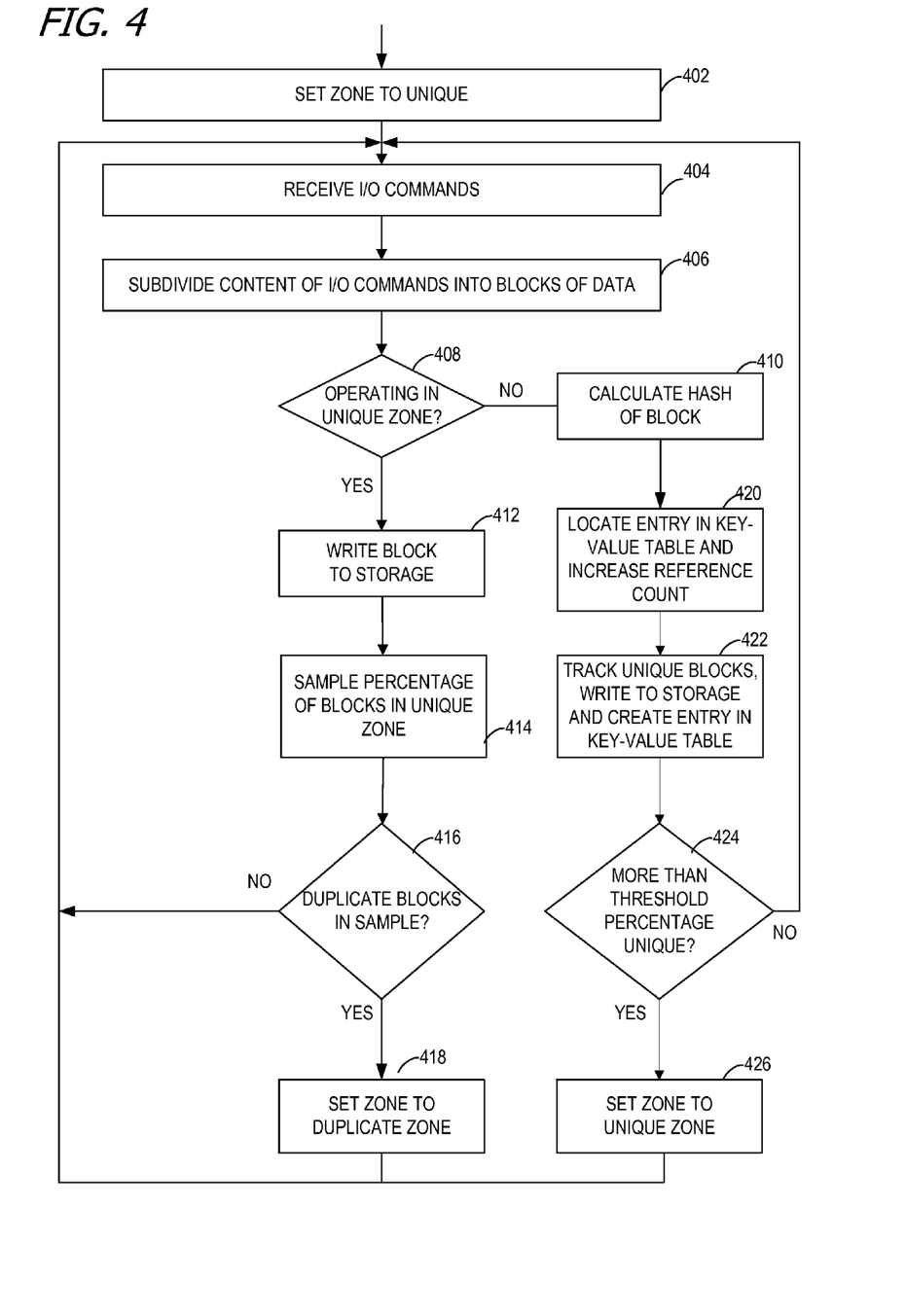
FIG. 4 is a flowchart of an example of the method of predictive probabilistic deduplication illustrated in FIG. 3.

FIG. 4 is a flowchart of an example of the method of predictive probabilistic deduplication illustrated in FIG. 3. In some examples, a hypervisor 710 performs the operations illustrated in FIG. 4. In other examples, a processor performs the operations to implement the I/O stack 106. At 402, the zone is initialized to unique. In other examples, the zone is initially assumed to be duplicate. Based on the type of activity generating the I/O stream, the initial assumption is changed to provide a better initial prediction. For instance, if a new document on a word processor is created, the zone is initialized as unique since all I/O received will be unique at the outset. However, if an existing document is opened in a word processor, the zone is initialized as duplicate in some examples, predicting that initially there will be no new content.

In some examples, the zone size is 1,000 blocks. In other examples, the zone size is configurable based on the type of workload and the cost of doing the deduplication. The zone size may be tracked to better predict when the zone might change. For example, if the I/O stream is rapidly changing between unique and duplicate content, smaller zone sizes would or a higher sampling rate would lead to better predictions.

At 404, I/O commands containing data, data items, payloads or other information are received. The I/O commands originate, in some examples from a user 608, a virtual machine (VM) 735, an application 770, a guest operating system 765, a client, or any other source of data. The data associated with the I/O commands is passed from their source, through the logical storage 104, to the I/O stack 106. The data is subdivided into blocks at 406. The blocks are, in some examples 4 k in size. In other examples, depending on the type of data, the size of the blocks varies. For example, I/O commands relating to database entries of a fixed size may have blocks of that size.

In the unique zone policy, the block is written to physical storage 110 at 412. A random sample of the blocks is taken at 414 to check for duplicate blocks. In some examples, the sample is taken after a complete zone of blocks is received. In other examples, if the size of a zone is not defined or is set to be very large, subsets of blocks are sampled as they are received. For example, the last block of every 600 blocks is sampled as blocks are received. The sample, in some examples, is 1% of the zone of blocks. However, in some examples, the sample size is adjusted based on the size of the duplicate zone to optimize the predictions. For example, if recent duplicate zone sizes are increasing, the sample size is tuned to be less than 1%. If the duplicate zone sizes are getting smaller, than the sample size is increased to be greater than 1%.

At 416, if enough duplicate blocks are detected in the sample, then the zone is changed to the duplicate zone at 418. In some examples, a threshold amount of duplicate blocks is set by a user 608. In other examples, the threshold is established based on the application 770, VM 735, guest operating system 765, etc. In some examples, more CPU processing resources are available for deduplication, and a lower threshold is selected in order to ensure the most accurate predictions. Adjusting the threshold variable, in some examples, is performed to increase or decrease the error rate of duplicate block prediction, but will also change the efficiency of the process.

Once the zone has changed to duplicate, the incoming I/O commands are processed under the duplicate zone policy. The operations of receiving the I/O commands at 404 and dividing the content of the I/O commands into blocks at 406 are identical under both policies. Under the duplicate zone policy, the hash of every individual block in the duplicate zone is calculated at 410. This is in contrast to the unique zone policy, where the hash is only calculated for blocks in the sample. The hash is used as the key for the key-value entry of the block in the key-value table 202 of the chunk store 108. The entry is in the example form of HashOfData as a key to <ReferenceCount, AddressOfData>. Initially, when an entry is created, the reference count (e.g., ReferenceCount) is set to zero or one, and the AddressOfData is set to the address of the block in the physical storage 110. If the ReferenceCount is set to one, the block is considered included in the key-value store (e.g., deduplicated). Another method is to set the ReferenceCount to zero. In that example, the key-value table 202 does not store the AddressOfData when the entry is created for the first unique block. Instead, when the same data are inserted the second time, the ReferenceCount is set to 1 and AddressOfData is set to point to the second copy of the data. In that example, when the ReferenceCount is zero, only the chunk store cannot find the physical data; the logical storage 104 of the data can still find the data. In that example, the logical storage 104 has pointer directly pointing to the data block on the physical storage 110, without going through the key-value table 202 on the chunk store 108.

Using the computed hash, the key-value table 202 is searched at 420. If the hash of the block is located in the key-value table 202, then the entry is updated appropriately. For example, the reference counter is incremented by 1 at 420. If the hash of the block is not located in the key-value table 202, then the block is unique.

At 422, unique blocks which are discovered within the duplicate zone are tracked. In some examples, a variable, such as the uniqueness counter described above, is used to track the number of unique blocks discovered in a specific duplicate zone. In that example, the uniqueness counter is incremented by 1, and the block is written to physical storage 110 and a corresponding entry is created in the key-value table 202. A unique block located in the duplicate zone is not treated the same as a unique block in the unique zone, since unique blocks in the unique zone are written directly to physical storage 110 without entry into the key-value table 202. Correctly predicting the uniqueness of blocks saves significant resources since fewer computations, reads, and writes are required.

Once the uniqueness counter reaches a defined threshold at 424, the zone is changed back to unique at 426. The threshold, in some examples, is ten percent of the zone size. In other examples, the threshold could be computed using a weighted average of the duplicate zone size. Blocks are processed continually by the system until the I/O stream ends.

Figure 5:
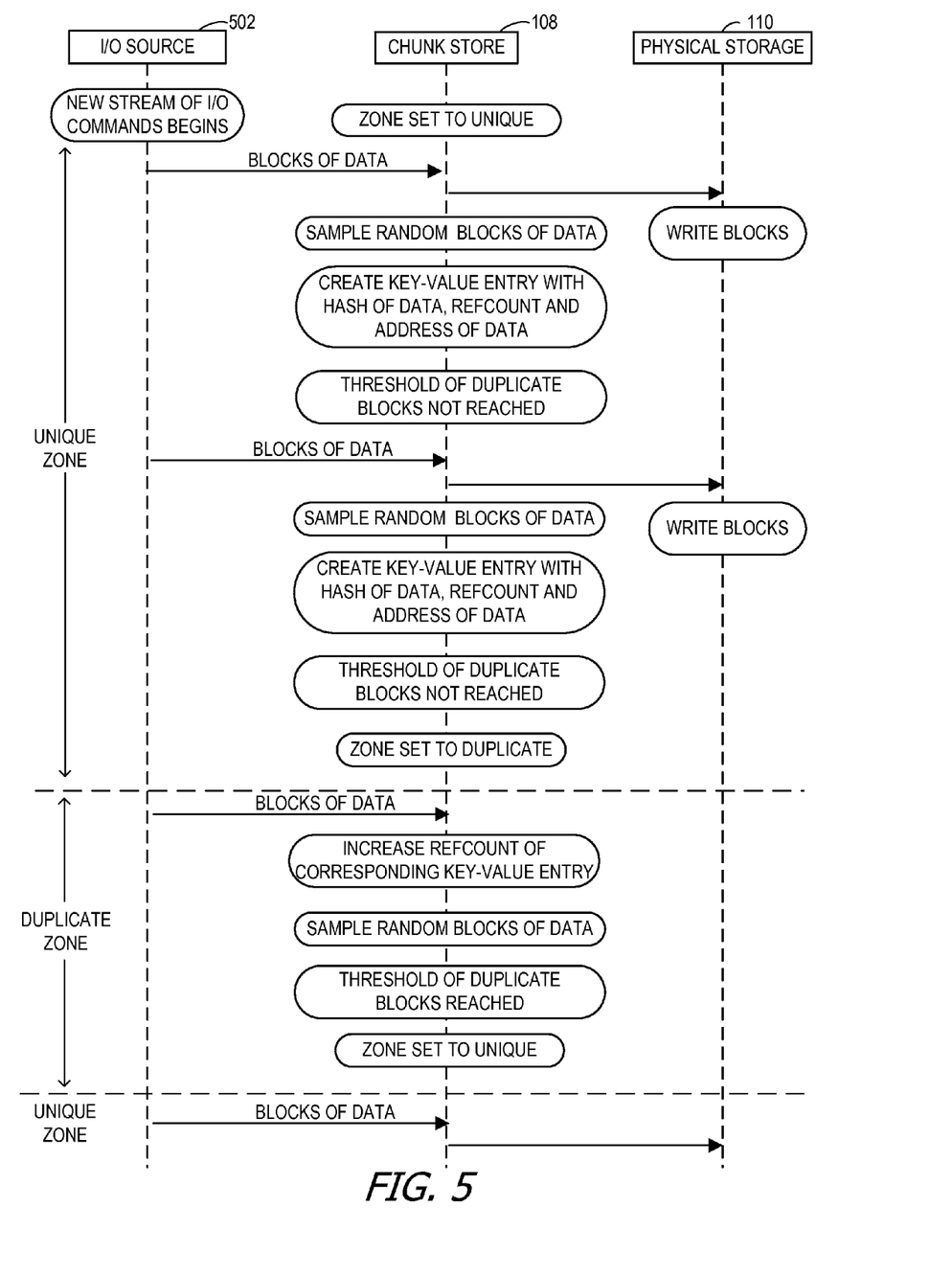
FIG. 5 is a sequence diagram illustrating the interaction between an input/output (I/O) source, a chunk store, and physical storage.

FIG. 5 is a sequence diagram illustrating an exemplary interaction between the I/O source 502, the chunk store 108, and the physical storage 110 during deduplication under the disclosed predictive probabilistic method. On the left-hand side of the drawing, the zone that the method is operating within is described. In the top portion of FIG. 5, above the dashed line, the zone is initially assumed to be unique. An I/O stream begins at the I/O source 502. The data contained in the I/O commands is transmitted to the physical storage 110 in blocks. In some examples, the transmission of data blocks occurs continuously as long as the I/O stream continues. A small percent of every one thousand blocks, for example 1%, are sampled to determine if the blocks are duplicate or if they are still unique.

Under the unique zone protocol, the chunk store 108 creates a new key-value entry in the key-value table 202 only for the sampled blocks of data, where sampled blocks are a percentage of all data. In some examples, the sample is 1% of the unique zone. The key-value entry includes the hash of the block as the key, a reference counter initialized to 1, and the address of the block on the physical storage 110 (some implementations use 0 and do not store the physical address for the first instance of a unique block).

In the example of FIG. 5, the blocks continue to be unique, and thus the process described above continues to repeat (e.g., iteratively) until a threshold amount of duplicate blocks are found. When duplicate blocks are found, the zone is changed from unique to duplicate. In the duplicate zone, the blocks are treated under the duplicate zone protocol. Instead of writing the blocks to storage and creating a new entry in the key-value table 202, the reference counter for those blocks is incremented in the key-value table 202. The blocks are treated under this duplicate zone protocol, until some threshold of unique blocks are detected (e.g, until ten percent of the incoming blocks are determined to be unique). Once the threshold is reached, the zone is switched back to the unique zone, and the blocks of data are treated under the unique zone protocol. While operating in the duplicate zone, unique blocks which are detected are written to storage, and an entry is created for them in the key-value table 202.

Figure 6:
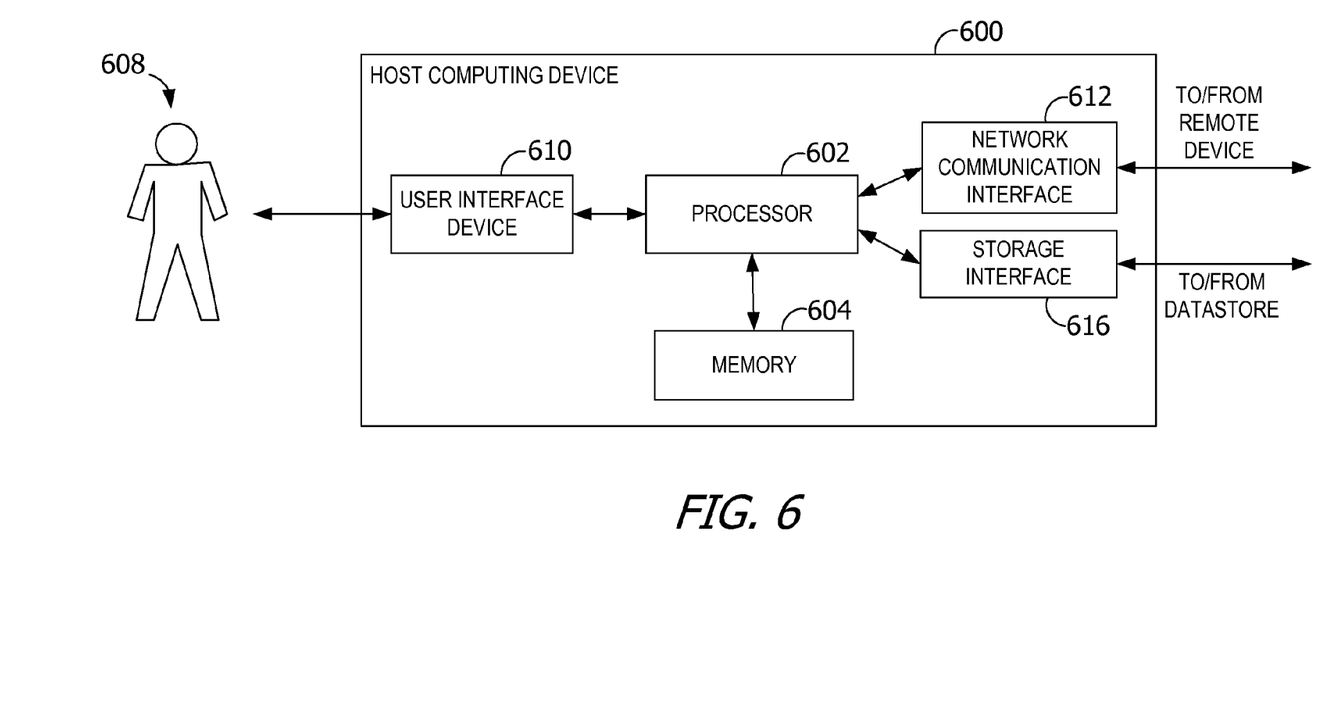
FIG. 6 is a block diagram of an example host computing device capable of housing one or more elements of a system performing predictive probabilistic deduplication.

FIG. 6 is a block diagram of an example host computing device 600. Host computing device 600 includes a processor 602 for executing instructions. In some examples, executable instructions are stored in a memory 604. Memory 604 is any device allowing information, such as executable instructions and/or other data, to be stored and retrieved. For example, memory 604 may include one or more random access memory (RAM) modules, flash memory modules, hard disks, solid state disks, and/or optical disks.

Host computing device 600 may include a user interface device 610 for receiving data from a user 608 and/or for presenting data to user 608. User 608 may interact indirectly with host computing device 600 via another computing device such as a computing device operating VMware's vCenter Server or other management device. User interface device 610 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 610 operates to receive data from user 608, while another device (e.g., a presentation device) operates to present data to user 608. In other examples, user interface device 610 has a single component, such as a touch screen, that functions to both output data to user 608 and receive data from user 608. In such examples, user interface device 610 operates as a presentation device for presenting information to user 608. In such examples, user interface device 610 represents any component capable of conveying information to user 608. For example, user interface device 610 may include, without limitation, a display device (e.g., a liquid crystal display (LCD), organic light emitting diode (OLED) display, or "electronic ink" display) and/or an audio output device (e.g., a speaker or headphones). In some examples, user interface device 610 includes an output adapter, such as a video adapter and/or an audio adapter. An output adapter is operatively coupled to processor 602 and configured to be operatively coupled to an output device, such as a display device or an audio output device.

Host computing device 600 also includes a network communication interface 612, which enables host computing device 600 to communicate with a remote device (e.g., another computing device) via a communication medium, such as a wired or wireless packet network. For example, host computing device 600 may transmit and/or receive data via network communication interface 612. User interface device 610 and/or network communication interface 612 may be referred to collectively as an input interface and may be configured to receive information from user 608.

Host computing device 600 further includes a storage interface 616 that enables host computing device 600 to communicate with one or more storage devices, which store virtual disk images, software applications, and/or any other data suitable for use with the methods described herein. In example examples, storage interface 616 couples host computing device 600 to a storage area network (SAN) (e.g., a Fibre Channel network) and/or to a network-attached storage (NAS) system (e.g., via a packet network). The storage interface 616 may be integrated with network communication interface 612.

Figure 7:
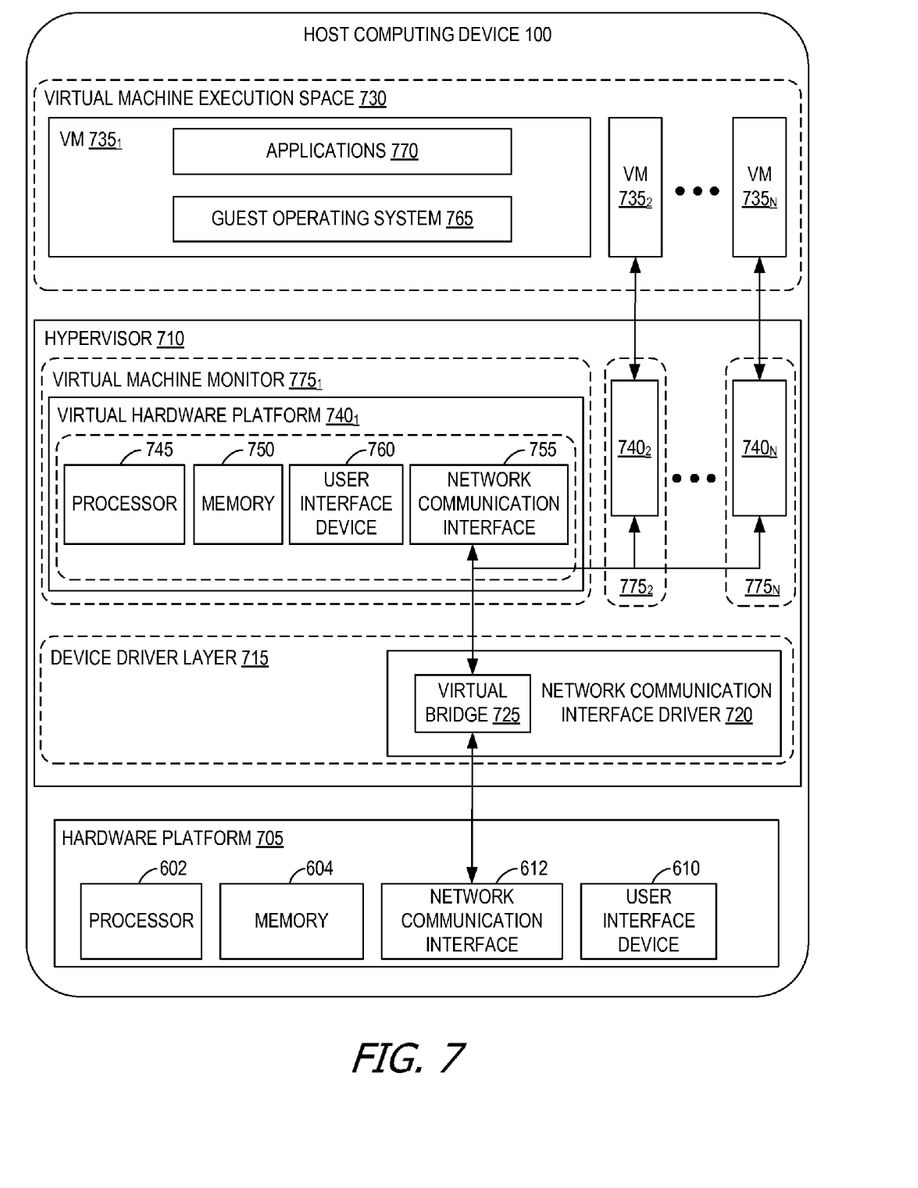
FIG. 7 is a block diagram of virtual machines for implementing an example of predictive probabilistic deduplication.

FIG. 7 depicts a block diagram of virtual machines $735_1$, $735_2 \ldots 735_N$ that are instantiated on host computing device 600. Host computing device 600 includes a hardware platform 705, such as an x86 architecture platform. Hardware platform 705 may include processor 602, memory 604, network communication interface 612, user interface device 610, and other input/output (I/O) devices, such as a presentation device 606 (shown in FIG. 6). A virtualization software layer, also referred to hereinafter as a hypervisor 710, is installed on top of hardware platform 705.

The virtualization software layer supports a virtual machine execution space 730 within which multiple virtual machines (VMs $735_1$-$735_N$) may be concurrently instantiated and executed. Hypervisor 710 includes a device driver layer 715, and maps physical resources of hardware platform 705 (e.g., processor 602, memory 604, network communication interface 612, and/or user interface device 610) to "virtual" resources of each of VMs $735_1$-$735_N$ such that each of VMs $735_1$-$735_N$ has its own virtual hardware platform (e.g., a corresponding one of virtual hardware platforms $740_1$-$740_N$), each virtual hardware platform having its own emulated hardware (such as a processor 745, a memory 750, a network communication interface 755, a user interface device 760 and other emulated I/O devices in VM $735_1$). Hypervisor 710 may manage (e.g., monitor, initiate, and/or terminate) execution of VMs $735_1$-$735_N$ according to policies associated with hypervisor 710, such as a policy specifying that VMs $735_1$-$735_N$ are to be automatically restarted upon unexpected termination and/or upon initialization of hypervisor 710. In addition, or alternatively, hypervisor 710 may manage execution VMs $735_1$-$735_N$ based on requests received from a device other than host computing device 600. For example, hypervisor 710 may receive an execution instruction specifying the initiation of execution of first VM $735_1$ from a management device via network communication interface 612 and execute the execution instruction to initiate execution of first VM $735_1$.

In some examples, memory 750 in first virtual hardware platform $740_1$ includes a virtual disk that is associated with or "mapped to" one or more virtual disk images stored on a disk (e.g., a hard disk or solid state disk) of host computing device 600. The virtual disk image represents a file system (e.g., a hierarchy of directories and files) used by first VM $735_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 715 includes, for example, a communication interface driver 720 that interacts with network communication interface 612 to receive and transmit data from, for example, a local area network (LAN) connected to host computing device 600. Communication interface driver 720 also includes a virtual bridge 725 that simulates the broadcasting of data packets in a physical network received from one communication interface (e.g., network communication interface 612) to other communication interfaces (e.g., the virtual communication interfaces of VMs $735_1$-$735_N$). Each virtual communication interface for each VM $735_1$-$735_N$, such as network communication interface 755 for first VM $735_1$, may be assigned a unique virtual Media Access Control (MAC) address that enables virtual bridge 725 to simulate the forwarding of incoming data packets from network communication interface 612. In an example, network communication interface 612 is an Ethernet adapter that is configured in "promiscuous mode" such that all Ethernet packets that it receives (rather than just Ethernet packets addressed to its own physical MAC address) are passed to virtual bridge 725, which, in turn, is able to further forward the Ethernet packets to VMs $735_1$-$735_N$. This configuration enables an Ethernet packet that has a virtual MAC address as its destination address to properly reach the VM in host computing device 600 with a virtual communication interface that corresponds to such virtual MAC address.

Virtual hardware platform $740_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 765 in order to execute applications 770 for an instantiated VM, such as first VM $735_1$. Virtual hardware platforms $740_1$-$740_N$ may be considered to be part of virtual machine monitors (VMM) $775_1$-$775_N$ that implement virtual system support to coordinate operations between hypervisor 710 and corresponding VMs $735_1$-$735_N$. Those with ordinary skill in the art will recognize that the various terms, layers, and categorizations used to describe the virtualization components in FIG. 7 may be referred to differently without departing from their functionality or the spirit or scope of the disclosure. For example, virtual hardware platforms $740_1$-$740_N$ may also be considered to be separate from VMMs $775_1$-$775_N$, and VMMs $775_1$-$775_N$ may be considered to be separate from hypervisor 710. One example of hypervisor 710 that may be used in an example of the disclosure is included as a component in VMware's ESX brand software, which is commercially available from VMware, Inc.

Example Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Example computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an example computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for probability-based deduplication of storage. For example, the elements illustrated in FIGS. 1, 2, 6 and/or 7, such as when encoded to perform the operations illustrated in FIGS. 3, 4, and/or 5, constitute exemplary means for receiving, by a processor, a plurality of I/O commands including content subdivided into a plurality of blocks of data, exemplary means for writing the blocks to storage and updating a key-value table, exemplary means for sampling the plurality of the blocks, exemplary means for predicting whether incoming blocks are unique or duplicate based on the sampling, and exemplary means for writing the incoming blocks to storage and updating the key-value table based on the prediction.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "example" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A method for probability-based deduplication of storage, said method comprising:
   receiving, by a processor, a plurality of input/output (I/O) commands, said plurality of commands including content subdivided into a first plurality of data blocks;
   setting the first plurality of data blocks as unique;
   writing the first plurality of data blocks to storage;
   sampling the first plurality of data blocks based on the first plurality of data blocks being set as unique to check for unique and duplicate blocks in the first plurality of the blocks and updating a key-value table with the sampled blocks;
   predicting, by the processor, based on the sampling, whether a second plurality of blocks is expected to be unique or duplicate, wherein said predicting is performed without writing the second plurality of blocks to the storage; and
   upon predicting that the second plurality of blocks is duplicate:
      updating the key-value table with the duplicate blocks;
      tallying unique blocks in the second plurality of blocks;
      writing the unique blocks to the storage and updating a value in a uniqueness counter corresponding to the tallying; and
      upon the value in the uniqueness counter exceeding a threshold, predicting that a next plurality of blocks is expected to be unique; and
   upon predicting that the second plurality of blocks is unique:

writing the second plurality of blocks to the storage; and continuing to perform said sampling and predicting with blocks of the received plurality of I/O commands, thereby deduplicating the content.

2. The method of claim 1, wherein updating the key-value table further comprises calculating a hash of a unique block, inserting the hash of the unique block as a key into the key-value table, and inserting a reference counter and an address of the block in the storage as the associated value of that key in the key-value table.

3. The method of claim 2, wherein the uniqueness counter is initialized at zero for a first instance of the unique block.

4. The method of claim 3, wherein upon receiving subsequent instances of the unique block a logical storage of that block points to the entry of the block in the key-value table which points to a location of that block on a physical storage.

5. The method of claim 1, wherein tallying unique blocks further comprises initializing the tally at zero upon changing to a prediction that the next plurality of blocks is duplicate from a prediction that the next plurality of blocks is unique.

6. The method of claim 1, wherein quality of predictions is tuned by sampling more frequently, changing the size of the zone, or changing the type of sampling based on previous predictions.

7. The method of claim 1, wherein the sampling is performed in at least one of the following ways: random, stratified, cluster, multistage, systematic, or in accordance with an algorithm.

8. The method of claim 1, wherein the processor performs operations to implement an I/O stack.

9. A non-transitory computer readable storage medium having stored thereon computer-executable instructions that, when executed by a processor, cause the processor to perform operations for probability-based deduplication of storage by:

initializing a first plurality of blocks included in a set of input/output (I/O) commands to unique;

writing the first plurality of blocks to storage;

sampling the first plurality of blocks based on the first plurality of blocks being initialized to unique;

updating a key-value table with the sampled blocks;

predicting, based on the sampling, whether other incoming blocks included in the set of I/O commands are unique or duplicate based on the sampling, wherein said predicting is performed without storing the other incoming blocks in the storage; and designating subsequent incoming blocks included in the set of I/O commands as unique or duplicate based on the prediction.

10. The non-transitory computer readable storage medium of claim 9, wherein the computer-executable instructions further cause the processor to deduplicate the storage without performing read commands on the storage.

11. The non-transitory computer readable storage medium of claim 9, wherein the computer-executable instructions further cause the processor to deduplicate the storage asynchronously or inline.

12. The non-transitory computer readable storage medium of claim 9, wherein the computer-executable instructions further cause the processor to sample blocks more often or less often based on the prediction.

13. The non-transitory computer readable storage medium of claim 9, wherein the computer-executable instructions further cause the processor to sample in at least one of the following ways: random, stratified, cluster, multistage, systematic, or in accordance with an algorithm.

14. A system for deduplicating storage in a predictive probabilistic manner, said system comprising:

an input/output (I/O) stack programmed to:

receive a stream of data blocks;

select a first plurality of data blocks from the received stream of data blocks;

set the first plurality of data blocks as unique;

write the first plurality of data blocks to storage;

sample the first plurality of data blocks based on the first plurality of data blocks being set as unique to check for unique and duplicate blocks in the first plurality of data blocks;

update a key-value table in a content-based chunk store with the sampled data blocks;

predict, based on the sampling, whether subsequent data blocks in the stream of data blocks are unique or duplicate, wherein said predicting is performed without writing the subsequent data blocks to the storage; and based on the prediction, designate the subsequent data blocks as unique or duplicate for further deduplication.

15. The system of claim 14, wherein the I/O stack further assigns the subsequent data blocks to a unique zone or a duplicate zone based on the prediction.

16. The system of claim 15, wherein the I/O stack further tallies unique blocks found in the duplicate zone.

17. The system of claim 16, wherein the I/O stack changes from the duplicate zone to the unique zone when the tallied unique blocks reach a threshold.

18. The system of claim 15, wherein the I/O stack further tracks a size of the unique zone and the duplicate zone and adjusts the sample based on the tracked size.

19. The system of claim 18, wherein the I/O stack adjusts the sample as a function of a weighted average of the tracked duplicate zone size.

20. The system of claim 14, wherein the I/O stack adjusts the sample based on the prediction.

* * * * *